July 24, 1962  J. R. GREENO ETAL  3,045,714
AUTOMATIC SPRING ASSEMBLY MACHINE

Filed July 13, 1959  10 Sheets-Sheet 4

INVENTORS.
John R. Greeno.
Thomas J. Luell.
BY Wood, Herron & Evans.
ATTORNEYS.

July 24, 1962

J. R. GREENO ETAL 3,045,714

AUTOMATIC SPRING ASSEMBLY MACHINE

Filed July 13, 1959

INVENTORS.
John R. Greeno.
BY Thomas J. Dull.
Wood, Herron & Evans.
ATTORNEYS.

United States Patent Office 3,045,714
Patented July 24, 1962

3,045,714
AUTOMATIC SPRING ASSEMBLY MACHINE
John R. Greeno, 219 Hill Top Lane, Wyoming, Ohio, and Thomas J. Dull, 1293 Prospect Place, Cincinnati 31, Ohio
Filed July 13, 1959, Ser. No. 826,666
14 Claims. (Cl. 140—92.94)

This invention relates to machines for assembling coil spring units of the type used for mattresses, bed springs, and the like, consisting of rows of coil springs joined together at top and bottom by helical wires. In fabricating the spring assemblies, the coil springs and helical wires are prefabricated; the assembly operation consists of positioning the coil springs in adjoining rows and of rotating and threading the helical wires upon mating portions of the springs at top and bottom.

In spring assemblies of the present type, the coil springs are generally of hour glass shape, as viewed from the side, with enlarged terminal coils at opposite ends which collectively delineate the top and bottom surface of the spring assembly. To facilitate the application of the helical wires, the terminal coils include straight portions which are offset outwardly at opposite sides, the offset portions of adjoining springs being placed in mating relationship. In this position, the helical is rotated so as to advance in corkscrew fashion to join the mating offsets as it advances from spring to spring along the row.

A machine for fabricating spring assemblies of this character is disclosed in the prior Patent 2,708,461 to John R. Greeno and Thomas J. Dull, the present inventors. In operating the prior machine, the individual coil springs are placed manually in row formation within the machine where the bottom terminals are confined in mating relationship with the terminals of a previously assembled row of springs. The bottom helical wire is then laced upon the mating offset portions of the bottom terminals by means of a power driven helical feeder, leaving the top terminals unattached. Thereafter, an indexing mechanism is actuated manually to shift the assembled springs rearwardly, then a helical wire is laced upon the unattached top terminals. The components of the prior machine, with the exception of the feeders, are actuated manually and the upper helical wire is guided by hand upon the top terminal coils.

One of the primary objectives of the present invention has been to provide a power-operated spring assembling machine which requires less effort on the part of the operator and which fabricates the spring assemblies at a faster production rate than has been possible in the past.

Described generally, the present machine is provided with upper and lower spring guides which are reciprocated relative with one another to engage the mating portions of the top and bottom terminals, together with upper and lower helical feeders mounted in alignment with the guides. In operating the machine, the guides are shifted to an intermediate or loading position and the individual coil springs are inserted from the front of the machine through a receiving section which partially compresses the springs and causes the terminal offsets to snap directly into open throats delineated by the upper and lower guides. The upper and lower guides are then shifted to a locking position, then both the upper and lower helicals are placed in the feeders and advanced concurrently through upper and lower spring guides and along the mating offsets to join the individual coil springs to the assembly at top and bottom. The upper and lower guides are arranged to guide the helicals in a positive manner upon the mating offsets as the helicals advance from spring to spring, whereby the helicals may be woven in place simultaneously at a high rate of speed and in an automatic manner.

In order to facilitate the rapid and positive lacing of the helicals, the upper and lower guides are provided with sets of locking fingers which engage the offsets within the upper and lower guides to hold the offsets precisely in mating position for application of the helicals. The locking fingers normally reside in a retracted position to facilitate insertion and stripping of the coil springs; the fingers are shifted to locking position in an automatic manner when the upper and lower guides shift to locking position for lacing on the helicals.

Another objective of the invention has been to provide a stripping mechanism which coacts with the upper and lower guides to carry the advancing helical in a guided path from spring to spring, and which also coacts with the indexing mechanism for shifting the assembly through an indexing stroke after the helical is threaded in place.

According to this aspect of the invention, respective stationary stripping elements are disposed longitudinally between the upper and lower spring guides, the arrangement being such that the guides are disposed in alignment with the strippers when in locking position, whereby the guides and strippers form a continuous passageway for guiding the upper and lower helical from one spring to the next. After the upper and lower helicals are applied, the upper and lower guides are shifted outwardly to a retracted position while the strippers remain stationary to confine the helicals and joined portions of the terminal coils in fixed planes. The indexing mechanism is then advanced to engage the helicals at points between the strippers, then is retracted to index the spring assembly rearwardly for the next assembly operation.

A further objective of the invention has been to provide a simple power apparatus for shifting the upper and lower spring guides to the loading, locking and retracted positions and for actuating the indexing mechanism during a cycle of operation.

According to this feature, the upper and lower guides are shifted to their several positions by a pair of thrust elements disposed in tandem and energized in various combinations to provide the several different strokes. According to the present machine, the thrust elements comprise air cylinders, one cylinder having an end anchored to the machine frame and a second cylinder being shiftable bodily relative to the piston rod of the first cylinder. The second cylinder includes a rack in driving connection with a pinion which actuates the upper and lower guides. The stroke of one cylinder is greater than the other and the three operating positions are obtained by applying air pressure to the cylinders in various combinations.

Still another feature of the invention rises in the use of an electrical control system including solenoid valves for operating the tandem cylinders of the upper and lower guides and the cylinder of the indexing mechanism in sequence to provide an automatic cycle of operation.

According to this aspect of the invention, the upper and lower guides reside in the loading position at the start of a cycle; after the coil springs are inserted and the helicals are applied to them, an automatic cycle may be initiated by depressing a push button switch. During the cycle, the upper and lower guides retract, leaving the helicals confined in the strippers, then the index mechanism advances and engages the helicals, and retracts, and finally the upper and lower guides shift from the retracted to the partially closed loading position for the next cycle of operation.

The invention further contemplates the use of limit switches associated with the upper and lower spring guides for initiating the cycle in an automatic manner in response to the application of the helicals, as distinguished from the use of the manual push button switch. The control system is also arranged to provide manual control of the machine by depressing individual push button switches for each operation.

The various other features and advantages of the invention will be more fully apparent to those skilled in the art from the following detailed description taken in conjunction with the drawings.

*General Arrangement*

Figure 1:
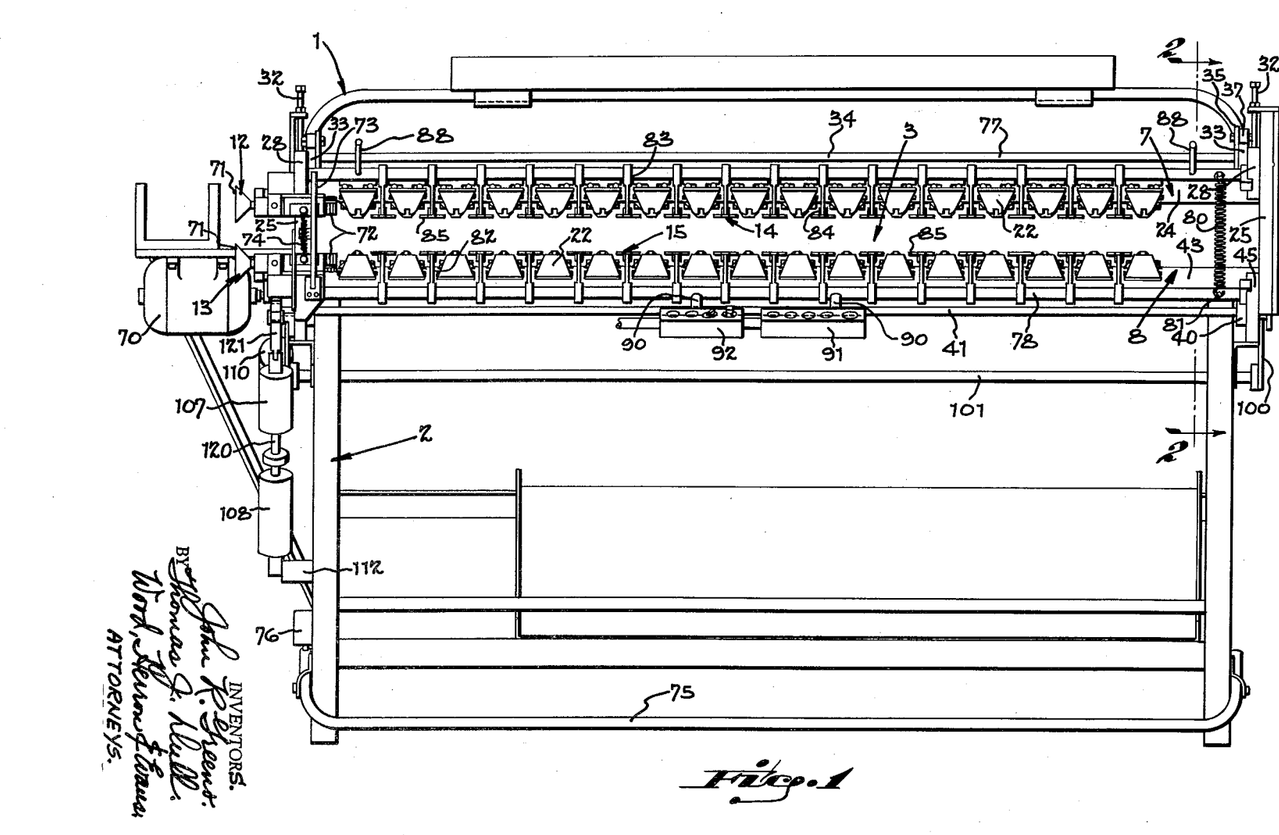
FIGURE 1 is a front elevation showing the general arrangement of a spring assembly machine constructed according to the principles of this invention.

Described generally with particular reference to FIGURE 1, the components of the machine are carried upon a frame 1 having legs 2 for supporting the mechanism at an elevation convenient to an operator. The mechanism, as explained in detail later, is driven automatically through successive cycles of operation which are initiated by the operator. However, the individual coil springs, and the helical wires which lace the coil springs to the spring assembly, are fed into the machine manually.

For this purpose, the forward portion of the machine comprises a spring-receiving section, indicated generally at 3, into which the individual coil springs are inserted by the operator. The frame further includes a table surface 4 (FIGURE 4) extending rearwardly from the spring-receiving section 3 and arranged to support the spring assembly 5 as it is fabricated and indexed rearwardly from the spring-receiving section 3.

The spring-receiving section in general comprises an individual converging throat for each individual coil spring 6, the arrangement being such that the springs are compressed slightly as they are pressed in place by the operator. At the start of the cycle, with the machine in loading position (FIGURE 4), the individual coil springs reside in row formation as indicated at A, in contiguous relationship with a previously inserted row of springs B which have been laced to the spring assembly 5 during the preceding cycle.

The spring-receiving section 3 communicates with an upper spring guide 7 and a lower spring guide 8 arranged to locate the row of springs A in position to be joined by upper and lower helical wires to the row B. The guides 7 and 8 shift in a vertical plane from the loading position (FIGURE 4) to a locking position (FIGURE 5) and finally to a retracted position (FIGURE 7) in each cycle of operation. As explained in detail later, the coil springs are provided with offset portions which snap into upper and lower receiving slots formed in the guides 7 and 8 when the springs are forced into the converging throats of the receiving section. After the coil springs are thus positioned, the upper and lower spring guides 7 and 8 are shifted from the loading position (FIGURE 4) to the locking position of FIGURES 5 and 6, as indicated by the arrows. In this position, the upper and lower guides are shifted toward one another, further compressing the adjoining coil springs A and B and also activating a pair of locking fingers 10—10, which are associated with the upper and lower guides. These fingers engage the mating offset portions of the springs A and B which reside within the slotted portion of the guides so as to hold these portions securely in position to be laced together by the helical wires at top and bottom.

Figure 4:
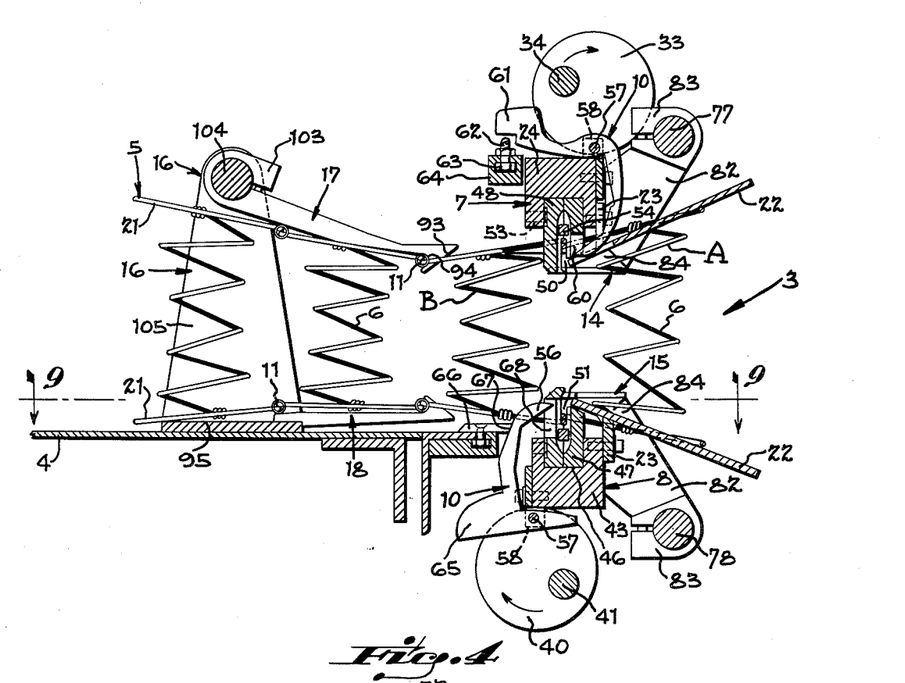
FIGURE 4 is a sectional view taken along line 4—4 of FIGURE 3, illustrated the spring guides and indexing mechanism in the spring loading position.
Figure 6:
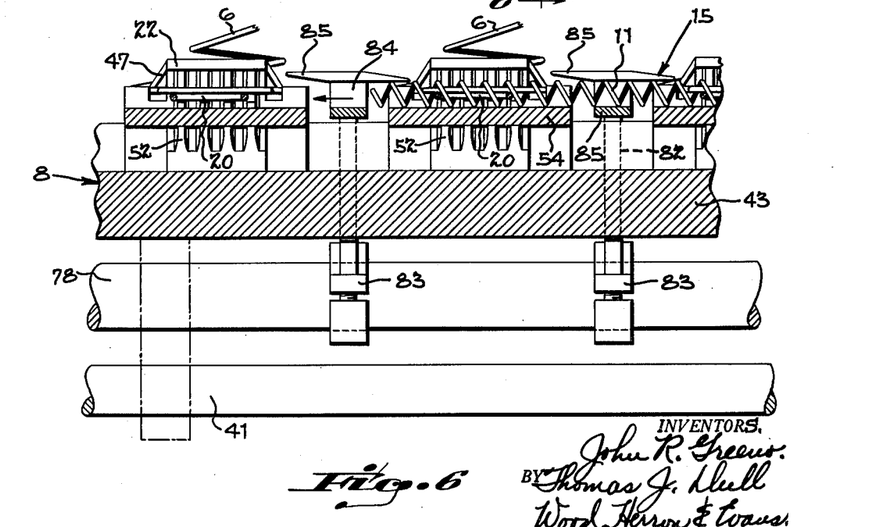
FIGURE 6 is a sectional view taken along line 6—6 of FIGURE 5, further illustrating the lower spring guide, and also showing the helical wire as it is threaded therethrough.
Figures 9, 14:
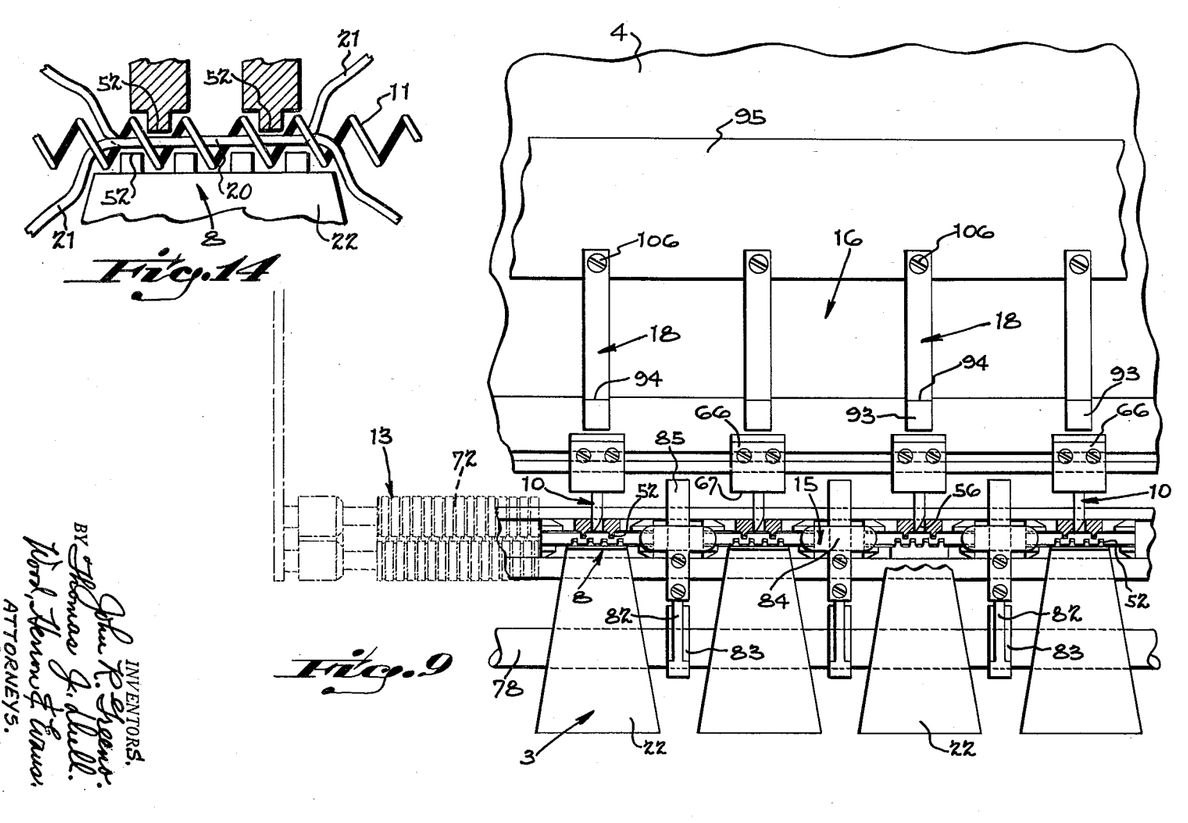
FIGURE 9 is a fragmentary plan view of the lower spring guide mechanism, with parts in section as taken along line 9—9 of FIGURE 4.
FIGURE 14 is an enlarged fragmentary plan view detailing a mating pair of assembled coil springs and related guide blocks or jaws which position the springs while the helical wire is threaded in place.

As indicated generally in FIGURES 4 and 6, the helical wires 11—11 are rotated and threaded in position by upper and lower helical feeders indicated at 12 and 13, which are aligned with guides 7 and 8 at the left side of the machine (FIGURES 1 and 9). The end portions of the helicals are placed manually in the feeders, then a hand lever is actuated which causes the feeders to rotate the helical wires, whereby the rotating helicals thread their way through the upper and lower guides 7 and 8 and about the mating offset portions of the springs as indicated by the arrow in FIGURE 6. The feeders 12 and 13 are of the type shown in our prior Patent 2,708,461 and have not been disclosed in detail in the present application.

After the helical wires 11 are threaded in place, the guides 7 and 8 are shifted outwardly to the retracted position (FIGURES 7 and 8), leaving the newly threaded helical wires 11 and mating portions of the coil springs confined within upper and lower strippers 14 and 15, which are mounted in stationary positions in alignment with the guides 7 and 8. At this point, an indexing mechanism 16 (FIGURE 7) advances and engages its upper and lower arms 17 and 18 with the upper and lower helicals 11—11, then shifts the spring assembly rearwardly across the table surface 4 so as to draw the newly joined row A through the receiving section 3 in a position to be joined to a new row of individual coil springs during the next cycle of operation.

Figure 7:
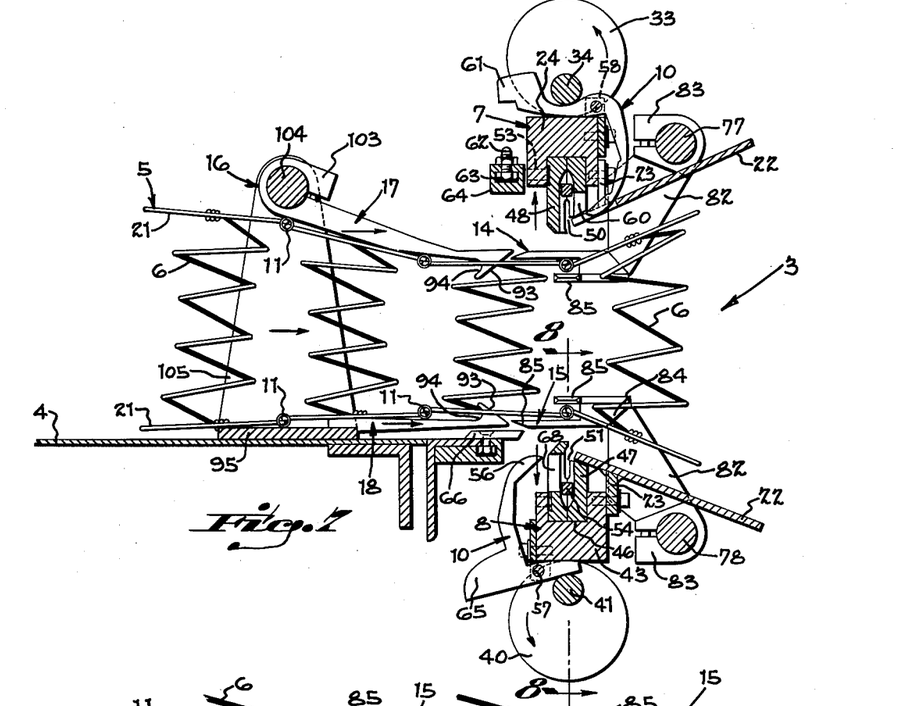
FIGURE 7 is a sectional view similar to FIGURE 5, showing the spring guides shifted to the retracted position after completion of the helical threading operation, with the indexing mechanism advancing to engage and index the spring assembly for the next cycle of operation.
Figure 8:
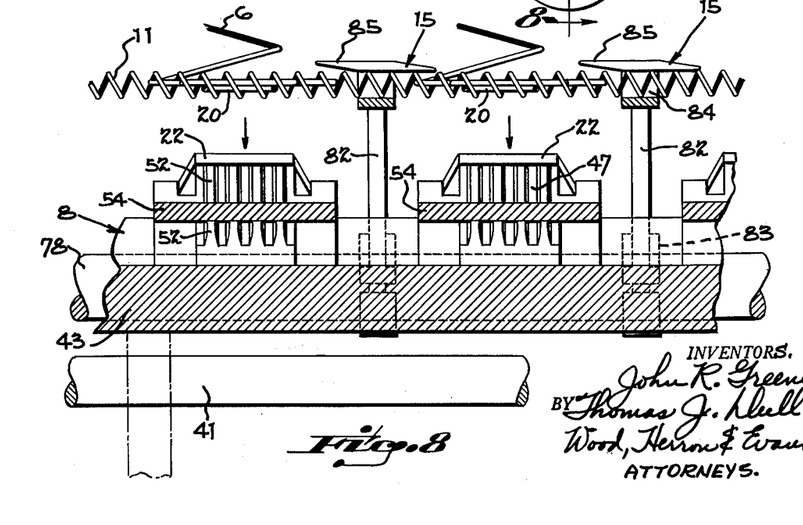
FIGURE 8 is a sectional view taken along line 8—8 of FIGURE 7, further illustrating the relationship of the parts in the retracted position.

As shown in FIGURES 6, 8 and 14, the mating portions of the coil springs are delineated by the offset portions 20 which are formed in the end or terminal coils 21—21 of the coil springs. The top and bottom terminal coils 21 are identical and the offset portions interfit the upper and lower guides 7 and 8 (FIGURE 14). After the indexing operation, the straight sections 21 of the newly joined row of springs A, on the trailing side thereof, reside in alignment with the upper and lower guides, which are retracted as in FIGURE 7. After completion of the indexing stroke, the upper and lower guides again shift to the loading position (FIGURE 4) so as to engage the offset portions 20. The next successive row A, which is now inserted into the receiving section 3, is so positioned that the offsets 20 of the new row overlie the offsets of the previous row within the guides 7 and 8. These guides are in the form of jaws which lock the offsets 20—20 securely in mating relationship during the threading operation, as explained later in detail.

The upper and lower guides 7 and 8 are provided with serrated surfaces, as described later, which engage the rotating helical wire, causing it to thread itself in a positive manner about the mating offsets 20. At completion of the threading operation, the helical wires 11 provide hinge connections between the adjoining rows of coils at top and bottom. The operation of placing the individual coil springs in the receiving section and of threading on the upper and lower helical wires is repeated row by row, the assembled spring unit being advanced in steps across the table surface 4 as each successive row of coil springs is added.

As explained later with reference to the control system, the cycles of the machine may be controlled either manually by push button control, or it may operate through automatic cycles which are initiated by operation of certain push buttons. Under manual control, individual push buttons, which are located at the front of the machine, are depressed by the operator to shift the upper and lower guide mechanism to the loading, unloading and retracted positions, and to activate the indexing mechanism when in retracted position.

On the other hand, under automatic control, the cycle starts with the guide mechanism in the loading position (FIGURE 4). After the coil springs are located in the guides 7 and 8, the operator depresses a lock button to shift the guides to the position of FIGURE 5, then feeds the helicals. Thereafter, the operator presses an unlock button. This button initiates an automatic cycle, causing the guides to retract (FIGURE 7) then causes the indexign mechanism to advance, engage the helicals within the strippers, then to index the spring assembly rearwardly for the next row of coil springs. After indexing, the guides 7 and 8 shift back to the loading position (FIGURE 4) to engage the trailing offsets 20, thus ending the cycle.

*Upper and Lower Spring Guides*

Figure 3:
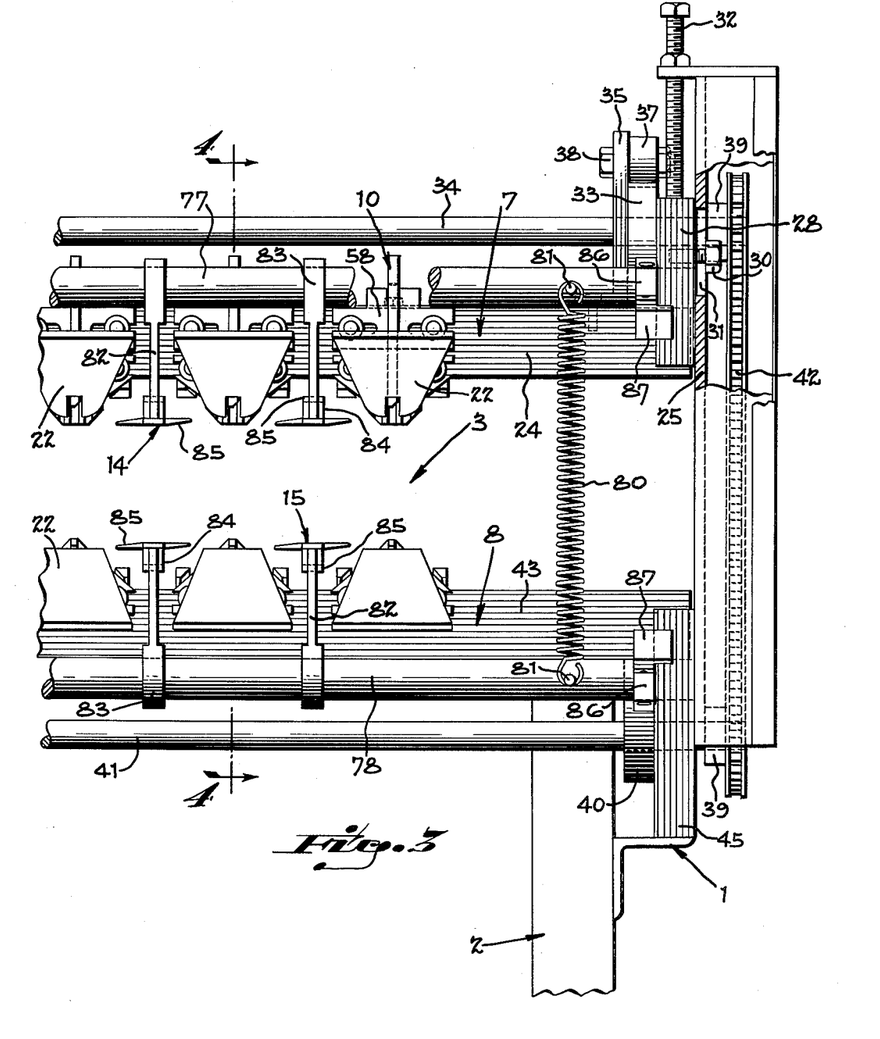
FIGURE 3 is an enlarged fragmentary front view projected from FIGURE 2, illustrating the upper and lower spring guides and associated parts.

Referring to FIGURES 3 and 9, the spring-receiving section 3 essentially comprises respective pairs of inclined skid plates 22—22 which form inwardly converging throats as viewed in FIGURE 4. The outer end of each throat provides a passageway which is greater than the expanded length of the coil springs 6, the arrangement being such that the operator simply pushes the individual springs into the throats so that the converging throats progressively compress each spring.

The upper and lower guides 7 and 8 reside adjacent the inner ends of the skid plates so that the offset sections 20 of the compressed coil springs snap directly into the jaws of the upper and lower guides. It will be understood that at this point there is provided a respective pair of skid plates 22—22 for each coil spring, with an upper and lower spring guide section associated with each pair, as shown in FIGURE 9. The skid plates 22 are mounted for reciprocation with the upper and lower guides, each skid plate being provided with a lug 23 (FIGURE 4) attached to the upper and lower guide structure. The upper and lower guides 7 and 8 are substantially in duplicate and both are actuated by a common source of power.

Described in detail (FIGURES 2 and 3) the upper guide 7 comprises a mounting bar 24 extending lengthwise of the machine and having its opposite ends engaged in vertical brackets 25—25 which rise from opposite sides of the frame 1 (FIGURE 1). The opposite ends of the mounting bar 24 are provided with respective slide blocks 26—26 slidably engaged in slide ways 27 formed in stationary guide blocks 28, which are attached to the brackets 25. As shown in FIGURE 3, each guide block 28 is clamped in position by a bolt 30 passing through a slot 31 of bracket 25. The guide blocks 28—28 are adjustable vertically in setting up the machine for a given type of coil spring. For this purpose, the bolts 30 at opposite ends are loosened, permitting the guide blocks and associated parts to be adjusted vertically by operation of the screws 32—32 at opposite ends, after which the blocks are clamped securely in place by the bolts 30.

Figure 2:
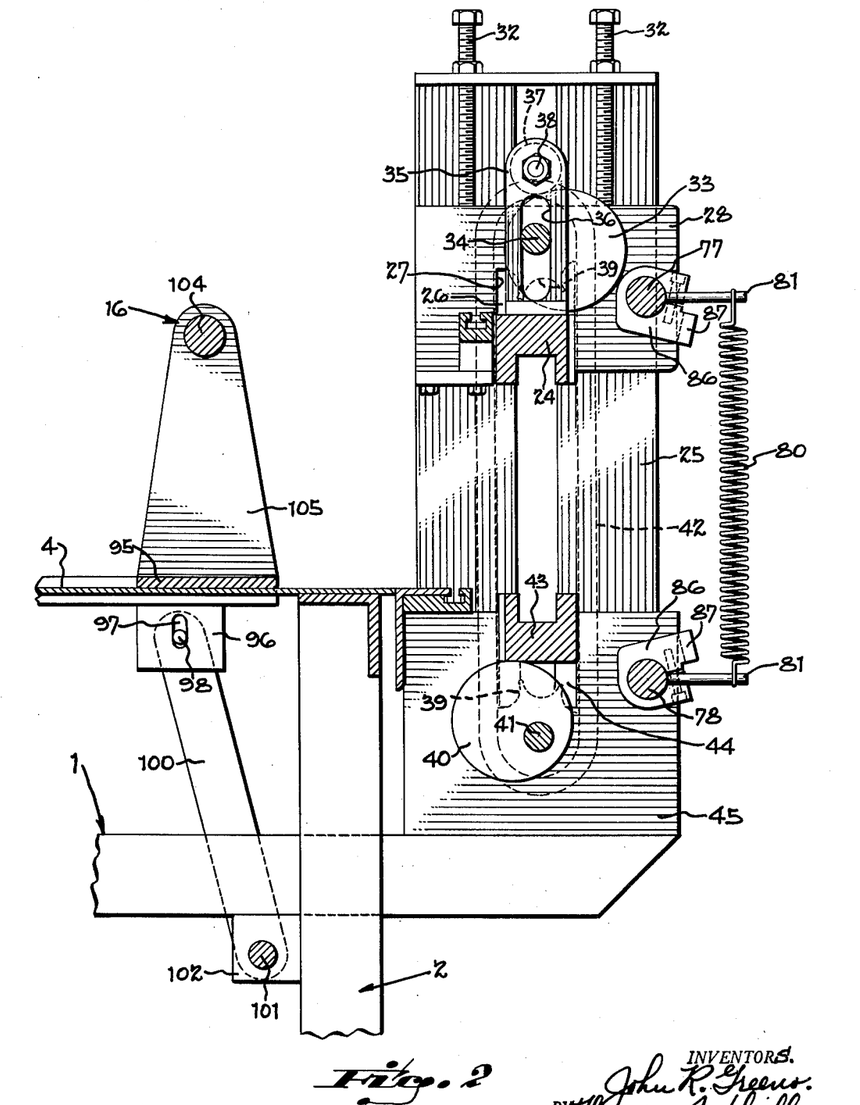
FIGURE 2 is an enlarged fragmentary sectional view, taken along line 2—2 of FIGURE 1, showing the eccentric mechanism for shifting the upper and lower spring guides to their several positions during an operating cycle.

During operation of the machine, the upper mounting bar 24 is reciprocated to its three different positions by a pair of eccentrics 33—33 mounted on a shaft 34, which has its opposite ends journalled in the guide blocks 28 (FIGURES 2 and 3). The opposite ends of mounting bar 24 includes respective hangers or roller brackets 35—35 rising upwardly, each hanger having a vertical slot 36 providing clearance for shaft 34. The upper end of hanger 35 includes a roller 37 journalled upon a bolt 38 and tracked upon the periphery of eccentric 33. The rollers 37 at opposite ends of the machine thus support the mounting bar 24 and its associated parts for reciprocation in a horizontal plane.

The lower guide 8 is shifted in unison with the upper guide by means of similar eccentrics indicated at 40—40 and mounted upon an eccentric shaft 41. The eccentric shafts 34 and 41 are rocked in unison by a sprocket chain 42 passing about the sprockets 39—39 of shafts 34 and 41 (FIGURES 2 and 3). During the operation of the machine, the lower shaft 41 is rocked to its three positions through the operation of power cylinders and this motion is imparted through chain 42 to the upper shaft, such that the upper and lower guides are shifted in unison through their three positions in the cycle of operation.

The lower mounting bar 43 (FIGURES 2 and 3) is similar to upper bar 24, including respective slide blocks 44—44 slidably carried in guide blocks 45—45 which are attached to the brackets 25—25. In this instance, the opposite ends of the mounting bar rest directly upon the periphery of the lower eccentric 40, to be shifted upon rocking motion of the eccentrics.

As best shown in FIGURES 5–8, the mounting bars 24 and 43 are provided with respective grooves 46—46 which face one another for supporting the spring positioning devices. As best shown in FIGURE 7, the positioning devices of the upper guide 7 comprises pairs of opposed blocks 47 and 48, the block 47 residing above the inner edge of the upper skid plate 22, while the opposed block 48 projects downwardly below the inner edge of the skid plate, so as to readily engage the offset 20 as the coil spring is inserted. The opposed blocks 47 and 48 are arranged in duplicate pairs along the upper and lower mounting bars as shown in FIGURE 8. It will be noted that each pair of opposed blocks of upper guide 7 delineate a vertical throat 50 (FIGURE 7) projecting upwardly from the inner edge of the upper skid plate. Accordingly, the coil spring is compressed as it passes between the converging skid plates, then the offset section 20 of the coil spring snaps into the throat 50, in final position (FIGURE 4). The sets of blocks 47 and 48 of the lower guide 8 delineate a similar throat 51 which extends downwardly from the inner edge of the lower skid plate to similarly receive the offset 20 of the lower terminal coil as shown in FIGURE 4.

As viewed in FIGURES 6, 8 and 9, the adjacent faces of the blocks 47 and 48, are provided with vertical serrations or teeth 52 which are staggered with respect to one another to provide a threaded engagement with opposite sides of the rotating helical wires at top and bottom. The spacing of the teeth is equal to the lead of the helical wire so as to provide positive advancement of the wire as it is rotated. The upper and lower guides are substantially identical, the face of the upper blocks 47 being serrated in the same manner as the lower blocks shown in FIGURES 8 and 9.

As best shown in FIGURE 7, the opposed blocks 47 and 48 at top and bottom are clamped in the groove 46 of the upper and lower mounting bars by respective set screws 53—53. A bar 54 (FIGURE 8) is inserted between the opposed blocks at the base thereof to maintain the spacing of the opposed jaws and also to support the helical wires 11—11 as they are advanced through the upper and lower guides.

*Locking Fingers*

Figure 5:
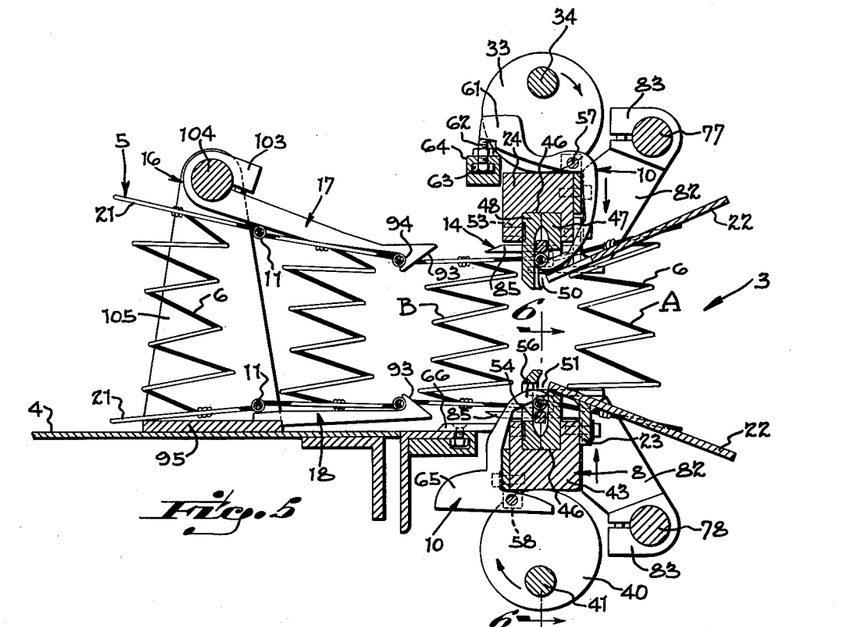
FIGURE 5 is a view similar to FIGURE 4, showing the guides in fully closed or locked position for threading the helical wire upon the mating portions of adjoining springs.

After the offset sections 20 of the terminal coils at top and bottom are engaged in the throats 50 and 51 (FIGURE 4), the upper and lower guides 7 and 8 are shifted toward one another to the final locking position shown in FIGURE 5, compressing the row of coil springs and conditioning them to receive the helicals 11. During this motion to locking position, the locking fingers 10—10 are shifted inwardly from a retracted position to engage the upper and lower coil spring offsets 20—20 which now reside in the throats 50 and 51. In the locking position of FIGURE 5, the locking fingers 10 force the offsets of the row A positively into mating engagement with the offsets of the row B at top and bottom (FIGURE 15).

Figure 15:
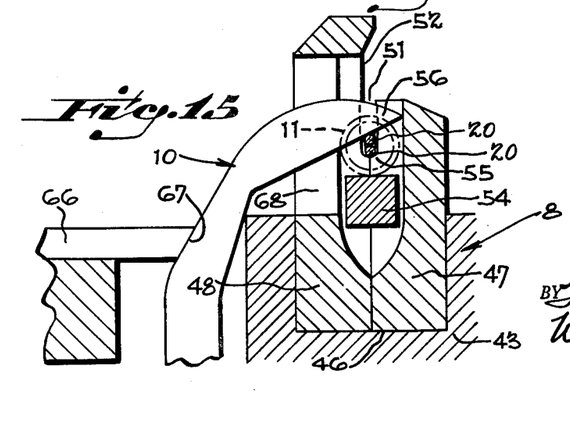
FIGURE 15 is an enlarged fragmentary view, further detailing one of the sets of spring positioning jaws, together with an associated finger in locking position.

As viewed in FIGURE 15, the bars 54 of the opposed positioning blocks are spaced from the inner end of the throat 51 to provide the clearance 55 between the surface of the bar 54 and the mating offsets 20—20. The upper guide structure is similarly arranged to provide clearance in the throat 50. The locking fingers thus force the mating offsets 20 together so each helical may advance through the clearance 55 and about the offsets 20 at top and bottom rapidly and in a positive manner. As viewed in FIGURE 9, the active ends 56 of the locking fingers are tapered and are located relative to the staggered teeth 52 to avoid interference with the advancing helical.

Described in detail (FIGURES 4 and 5) the upper locking fingers 10 are each pivotally mounted as at 57 to a bracket 58 attached to the upper mounting bar 24. The finger curves downwardly and its active end 56 passes through a slot 60 formed in the block 47 to permit engagement with the top offsets 20. As viewed in FIGURE 5, each top finger 10 is generally right angular in shape and its extension beyond the pivot 57 includes at its outer end an enlarged counterweight portion 61 which normally balances the finger in the retracted position of FIGURE 4. Beneath the counterweight portion there is provided an actuating screw 62 having a head 63 which is mounted in a stationary rail 64, the rail having a T-slot engaging the head 63 to permit longitudinal adjustment of each actuating screw 62.

During the downward motion of the upper mounting bar 24 from the position of FIGURE 4 to FIGURE 5, each locking finger 10 moves downwardly with bar 24 until its counterweight portion contacts the stationary actuating screw 62. At this point, the finger begins to swing about its pivot 57, causing the active end 56 of the finger to shift into engagement with the offsets 20 within the upper guide (FIGURE 15).

The lower locking finger 10 is carried by the lower mounting bar 43 by a similar bracket 58 having a pivot bearing 57 (FIGURE 4). The lower finger includes a counterweight portion 65 normally balancing the finger to the position shown, with the active end 56 of the finger resting against a stationary cam plate 66 which is attached to the frame 1 of the machine. The surface of the finger which contacts the cam plate is inclined as at 67.

As the lower mounting bar 43 shifts upwardly to the locking position of FIGURE 5, the inclined surface 67 of the finger provides a camming action with respect to the plate 66, causing the active end of the finger to pass through the slot 68 of the lower guide 8 and into pressure engagement with the mating offsets 20—20 therein.

*Helical Feeders*

After the upper and lower guides 7 and 8 are shifted to locking position (FIGURE 5), with the fingers 10—10 holding the mating portions of the coil springs together, the operator feeds the upper and lower helicals 11 through the upper and lower guides 7 and 8. As noted earlier, the helical feeders 12 and 13 do not form a part of the present invention and have not been disclosed in detail; however, the following general description will facilitate a more complete understanding of the invention. It will be understood that the helical wires 11 are supplied to the operator in lengths suited to the size of the spring section being assembled, and that both helicals are threaded in place at the same time.

Referring to FIGURES 1 and 9, the upper and lower feeders 12 and 13 are identical and both are driven by a reversible motor 70 which may be energized continuously during operation of the machine. After the upper and lower guides 7 and 8 are shifted to locking position, the operator inserts the ends of the helicals into the funnel-shaped helical receivers 71 of the feeders 12 and 13. Each feeder includes a set of three equally spaced driving rollers 72, and each helical receiver 71 includes a tube axially aligned with the rollers and communicating with the space delineated by them. The sets of rollers 72 are driven by the motor 70 in the same direction so as to frictionally engage and advance the helicals.

In order to start the helical wires through the feeders, the rollers of each feeder are spread apart by operation of a manual lever 73 which is shifted in one direction to open both sets of rollers for admission of the helicals. The helicals are then pushed through the receivers 71 until their leading ends are disposed in position for engagement by the rollers 72. Thereafter, the operator shifts the lever 73 to a second position, causing the rollers to move into frictional engagement with the upper and lower helicals. The gripping force is supplied by a tension spring 74 which is common to both feeders.

After the driving rollers are engaged, the helicals advance rapidly through the upper and lower guides 7 and 8 and through the upper and lower strippers 14 and 15. They automatically stop as their trailing ends pass beyond the driving rollers of the feeders, thus completing the lacing operation.

The motor 70 is reversible in order to back up the helical in case it becomes jammed or does not thread properly upon the mating offsets 20 of the coil springs. In order to reverse the motor, there is provided a treadle bar 75 (FIGURE 1) extending across the base of the machine and interconnected with a reversing switch 76. In case one of the helicals should become jammed, the driving rollers continue rotating but slip with respect to the stuck helical, while the other continues its advancement automatically. It is therefore a simple matter for the operator to depress the treadle bar 75 so as to withdraw the stuck helical and then make the necessary adjustment.

After the helicals are threaded in place, the upper and lower guides 7 and 8 may be shifted to the retracted position shown in FIGURES 7 and 8 to disengage the guides relative to the mating offsets 20 which are now joined by the helicals. As the guides 7 and 8 are shifted toward the retracted position as indicated by the arrows (FIGURE 7), the locking fingers 10—10 also shift to a retracted position, as shown in this view, leaving the helicals engaged in the stationary upper and lower strippers 14 and 15 for subsequent shifting of the spring assembly 5 through operation of the indexing mechanism 16.

*Strippers*

As viewed in FIGURES 6 and 9, the strippers 15 of the lower spring guides 8 are located between the pairs of opposed positioning blocks 47 and 48, such that the advancing helical is guided by the strippers as it advances from one set of blocks to the next, as indicated by the arrow. The strippers 14 for the upper guide 7 are similarly located in a stationary position between the sets of positioning blocks and serve to guide the upper helical from one set of blocks to the next. Both strippers 14 and 15 are mounted in stationary position during normal operation of the machine, such that the upper and lower spring guides shift relative to the strippers, as shown in FIGURES 4–8.

Described in detail with reference to FIGURES 2–4, the upper strippers 14 are carried by a stripper shaft 77 having its opposite ends journalled in the guide blocks 28—28 of the upper eccentric shaft 34. The lower stripper shaft 78 is similarly journalled in the guide blocks 45—45 of the lower eccentric shaft 41. The shafts 77 and 78 are spring urged to normally hold the upper and lower strippers in alignment with the guide bars 54 of the sets of positioning blocks, as indicated in FIGURE 6. However, the spring loading of the stripper shafts permits the strippers to be sprung toward one another to prevent injury to the operator's hands, and also to prevent breakage of parts in case the machine is jammed. As shown in FIGURE 2, the stripper shafts are spring-biased by the tension spring 80 having its opposite ends anchored upon the pins 81 which project from the upper and lower stripper shafts.

Referring to FIGURES 3, 7 and 8, the upper strippers 14 each comprise a stripper bracket 82 having a split portion 83 clamped upon the upper stripper shaft 77. The outer end of each bracket 82 includes an open yoke 84 having spaced fingers 85—85 delineating a passageway to loosely embrace the advancing helical. In the locked position (FIGURES 5 and 6) the yokes 84 are aligned with the advancing helical, such that the positioning blocks and strippers delineate a continuous passageway for the helical.

The lower strippers 15 are similar to the upper strippers each comprising a stripper bracket 82 embracing the lower stripper shaft 78 and having an open yoke 84 on the outer end of the bracket 82. It will be noted in FIGURES 7 and 8 that the upper and lower strippers confine the upper and lower helical wires 11 and the associated terminal coils in fixed planes when the upper and lower guides 7 and 8 are retracted for the indexing stroke. As explained later, the strippers hold the helical wires in stationary position while the arms 17 and 18 of the indexing mechanism advance and establish a hook-on engagement with the helical wires at points located longitudinally between the strippers.

In order to maintain the yokes in the normal position, the upper and lower stripper shafts 77 and 78 (FIGURES 1 and 2) are provided with respective stops, each consisting of a clamp block 86 engaging the shaft and having a right angular lug 87. These lugs engage the outer edge of the guide blocks in which the shafts are journalled and thus oppose the force of the tension spring 80.

As shown in FIGURE 1, the upper stripper shaft 77 is provided with a pair of hand levers 88 located at opposite ends of the machine. These levers are pushed upwardly in order to shift the upper strippers 14 downwardly, if necessary, to clear an obstruction. The lower stripper shaft 78 is also provided with outwardly projecting levers 90 for the same purpose. The lower levers 90 are also utilized to support the switch boxes 91 and 92 which control the cycle of operation, the arrangement being such that downward pressure on the switch boxes disengage the lower strippers 15.

*Indexing Mechanism*

The indexing mechanism 16 normally resides in the retracted postion shown in FIGURES 2 and 5. This mechanism is actuated by a power cylinder to shift the upper and lower arms 17 and 18 forwardly to engage the helicals at points between the strippers after the upper and lower guides 7 and 8 have been shifted to the retracted position (FIGURE 7). As shown in FIGURE 7, the outer ends of each arm 17 and 18 are provided with an inclined cam surface 93 leading to a hook 94. As the indexing arms shift forwardly, the upper and lower helicals are restrained by the upper and lower strippers 14 and 15, such that the inclined surfaces 93 cam across the helicals, thus springing them inwardly and causing the helicals finally to snap outwardly to be engaged by the hooks 94. Thereafter, the indexing mechanism is retracted so as to shift the spring assembly 5 rearwardly across the table surface 4. It will be noted that the hooks 94 engage the helicals at points encircling the offsets 20, which previously were engaged in the upper and lower guides 7 and 8, now retracted.

The indexing mechanism comprises an indexing rail 95 (FIGURES 2 and 9) slidably supported on table 4 and having a downwardly depending lug 96 at opposite ends. Each lug is slotted as at 97 for slidable engagement by a pin 98 carried on the swinging end of a lever 100. The levers 100 are located at opposite ends of the machine and are mounted for swinging motion upon a rock shaft 101 journalled in bearing blocks 102. The rock shaft 101 is actuated by a power cylinder, as explained later.

The upper arms 17 of the indexing mechanism are clamped as at 103 upon a mounting bar 104 which is supported by brackets 105—105 rising from opposite ends of the receiving rail 95. The lower arms 18 (FIGURE 9) are attached by screws 106 to the forward edge of the reciprocating rail 95 and reside below the upper arms in vertical alignment therewith. It will be noted in this view that the upper and lower arms are aligned with the positioning blocks 47 and 48, such that the hooks engage the helicals and mating offsets 20 during the indexing stroke, with the blocks retracted (FIGURE 7).

*Power Cylinders*

As pointed out earlier, the upper and lower guides 7 and 8 normally reside in the loading position (FIGURES 4 and 10) and are shifted to the locking and retracted positions by power cylinders; the indexing mechanism is likewise actuated by a power cylinder, as shown diagrammatically in FIGURES 10–13. In the present disclosure, the power cylinders are activated by air pressure through operation of solenoid valves which are regulated by an electrical control system. The control system provides partially automatic cycles of operation or complete manual control through the operation of push buttons as described later with reference to the circuit diagram shown in FIGURE 16.

Figures 10, 11:
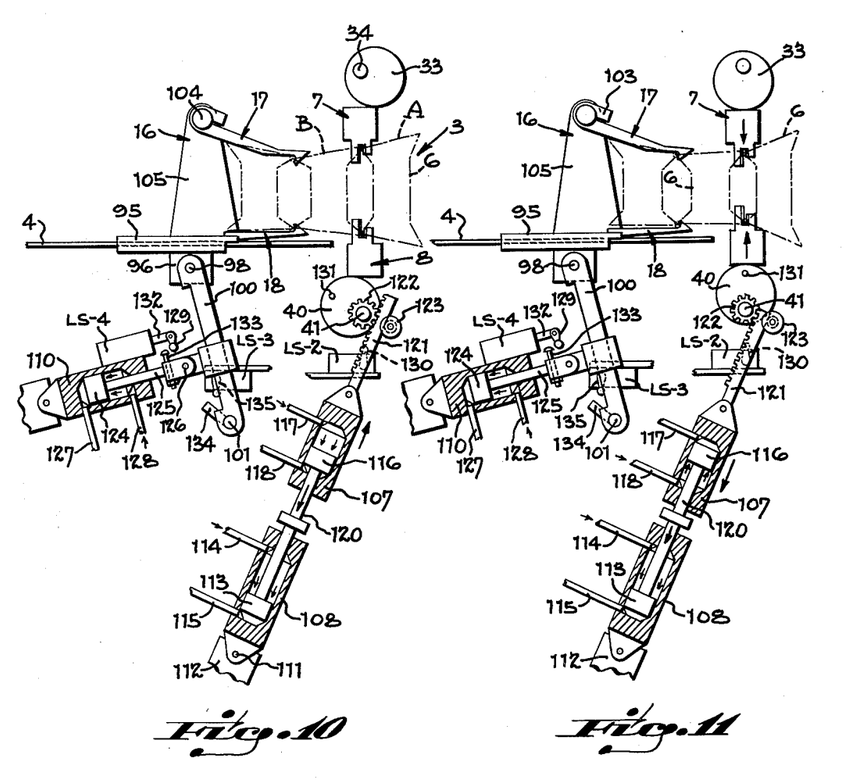
FIGURE 10 is a diagrammatic view of the power cylinders and actuating mechanism, showing the upper and lower spring guides in the loading position corresponding to that shown in FIGURE 4.
FIGURE 11 is a view similar to FIGURE 10, showing the spring guides in the locked position corresponding to FIGURE 5.

Referring to FIGURE 10, the upper and lower guides 7 and 8 are both in their loading position, the coil springs 6 being shown in broken lines, with the indexing mechanism 16 advanced as in FIGURE 4. In order to obtain the three positions, the upper and lower guides are shifted by a pair of cylinders 107 and 108 arranged in tandem. These two cylinders are activated in combination with one another to provide the three spring guide positions as shown in FIGURES 10–13. As shown in FIGURE 1, the cylinders 107 and 108 are mounted at the left end of the machine frame. The cylinder 108 has substantially twice the stroke of its companion cylinder 107 to provide the necessary positions of the spring guides. The cylinder 110, which actuates the indexing mechanism, is mounted adjacent the cylinders 107 and 108.

Described in detail (FIGURES 1 and 10), the lower cylinder 108 is pivotally anchored as at 111 to a lug 112 projected from the machine frame 1. The piston 113 of cylinder 108 is actuated by the air conduits 114 and 115 which are connected to certain solenoid valves of the control system which act as reversing valves to provide forward or reverse piston motion.

The upper cylinder 107 includes a piston 116 connected to the lower piston by the piston rod 120. The movements of the upper piston 116 are also regulated by solenoid valves interconnected with the conduits 117 and 118. The upper cylinder includes a rack 121 meshing with a pinion 122 which is keyed to the lower eccentric shaft 41. The rack is held in mesh with pinion 122 by a roller 123 which is journalled on the machine frame.

It will be noted that the upper cylinder 107 moves bodily with respect to the lower cylinder 108 so as to impart to the rack 121 the motion of both cylinders. Thus, in the loading position of FIGURE 10, air pressure is applied to the conduits 114 and 117, thereby retracting the piston rod but advancing the upper cylinder and rack to an intermediate position, as indicated by the arrows. During this motion, air is exhausted by way of the conduits 115 and 118. Since pinion 122 is keyed to the lower eccentric shaft 41, the upper and lower eccentrics 33 and 40 are rotated in unison (through sprocket chain 42 and sprockets 39) to the intermediate position as shown in FIGURE 4.

The indexing cylinder 110 includes a piston 124 having a piston rod 125 pivotally connected as at 126 to the indexing lever 100. Air pressure is supplied by a solenoid valve to the conduits 127 and 128 to cause reciprocation of the indexing piston 124.

The upper and lower guide actuating mechanism includes a limit switch LS–2 having an arm 130 which is actuated by a pin 131 carried by the lower eccentric 40. The indexing cylinder 110 likewise is provided with a limit switch LS–4 having a stem 132 actuated by a pin 133 carried by the piston rod 125. As described later with reference to the electrical circuit, switch LS–4 is normally open and is closed by the pin 133 as the indexing mechanism shifts the spring assembly rearwardly. In order to provide one-way operation of the switch, the stem 132 has a pawl element 129 which allows the pin to pass without tripping the switch during forward motion as in FIGURES 12 and 13 but which trips the switch to closed position upon motion from the forward position (FIGURE 13) back to the retracted position of FIGURE 12.

When the upper and lower guides are to be shifted to the locking position (FIGURE 11), the air pressure is applied to the conduits 114 and 118 and exhausted through the remaining conduits. This causes both the piston rod 120 and upper cylinder 107 to be retracted, as indicated by the arrows, to shift the eccentrics to their second or locking position. During this operation, the indexing cylinder 110 remains inactive.

When the upper and lower guides are to be shifted to the retracted position (FIGURE 12), air pressure is applied to the conduits 115 and 117, causing both the piston rod 120 and cylinder 107 to be advanced as indicated, thereby rotating the eccentrics through a half turn from the locking position (FIGURE 11) to the retracting position. In the retracted position, the pin 131 of lower eccentric 40 trips the limit switch LS–2 as indicated. Limit switch LS–2, through the control system, causes air pressure to be applied to conduit 127 of indexing cylinder 110 (FIGURE 13), causing the indexing mechanism to advance to pick-up position to engage the helicals.

Figure 13:
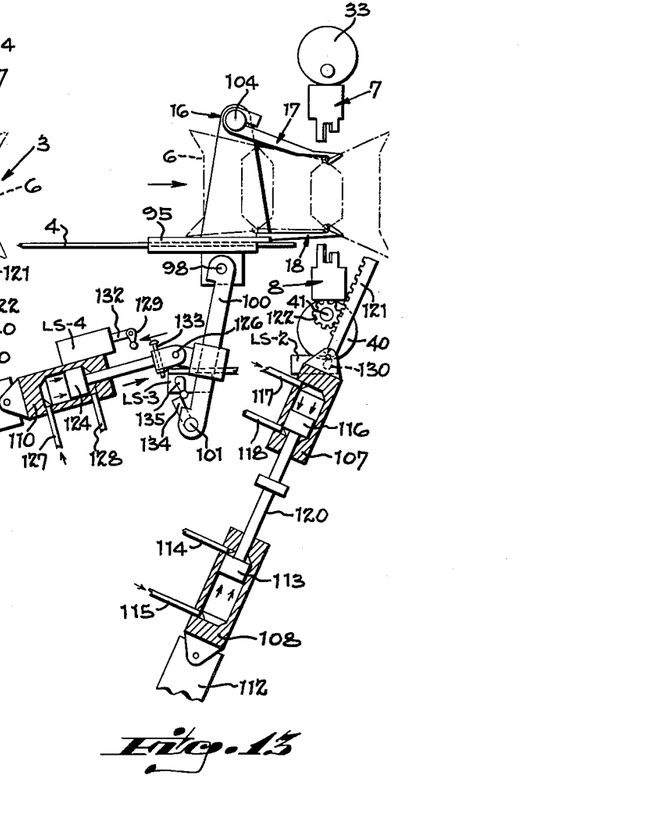
FIGURE 13 illustrates the action of the indexing mechanism after the spring guides have been shifted to the retracted position.

As the indexing lever 100 advances to the position of FIGURE 13 to engage the helicals, a finger 134 projecting from indexing shaft 101 trips the arm 135 of a limit switch LS–3 (FIGURE 13). Upon being tripped, limit switch LS–3 activates the solenoid valve which reverses the air pressure to indexing cylinder 110, thereby indexing the spring assembly rearwardly for the next cycle (FIGURE 10).

As the indexing mechanism retracts, pin 133 of the indexing cylinder 110 trips the one-way pawl 129 of limit switch LS–4. This energizes a solenoid valve which supplies pressure to conduits 114 and 117, causing the upper and lower guides to shift from the retracted position (FIGURE 13) back to the loading position (FIGURE 10).

Electrical Control System

Figure 16:
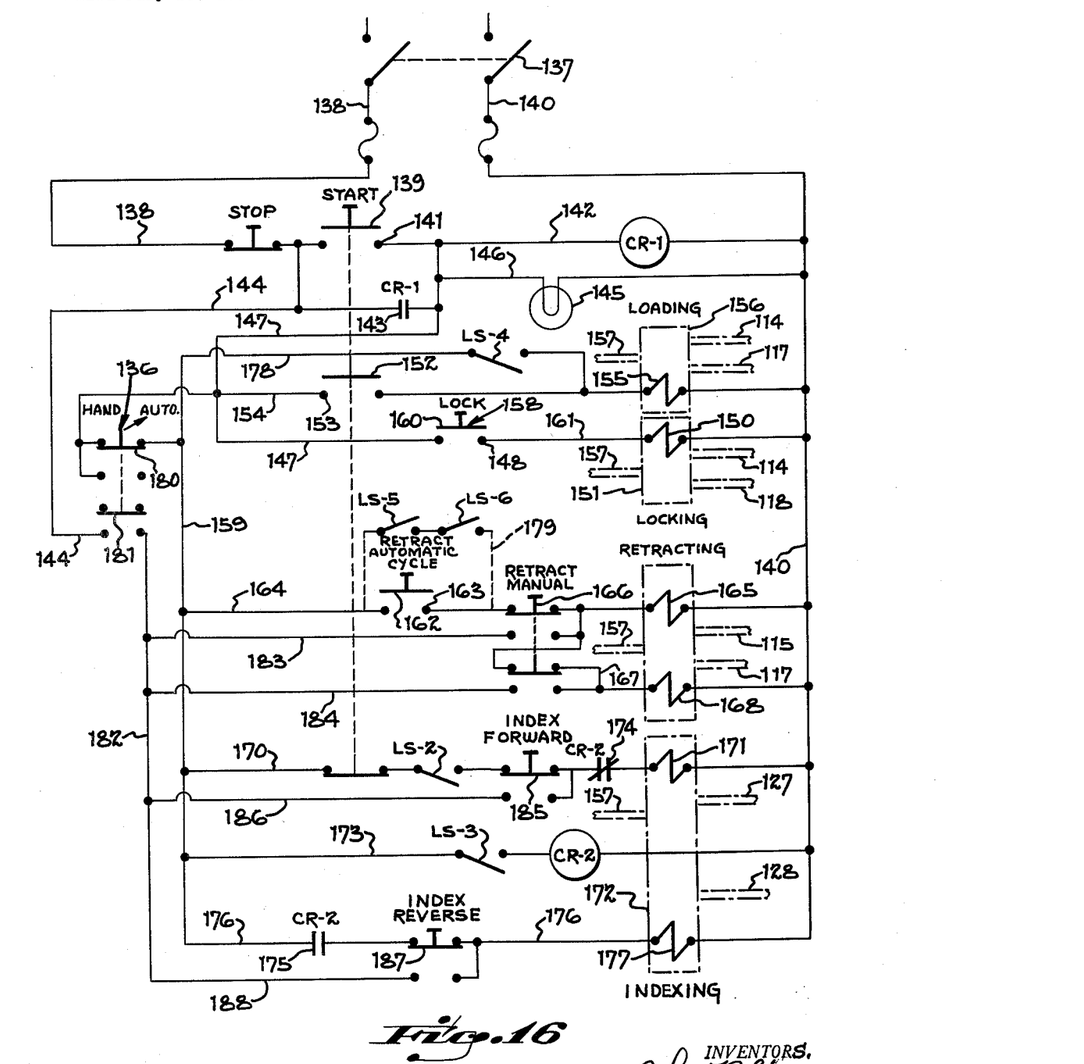
FIGURE 16 is a circuit diagram of the electrical control system.

Referring to FIGURE 16, the electrical circuit provides either manual or automatic operation in accordance with the position of a selector switch indicated at 136, which is shown shifted for automatic operation. The control circuit energizes the solenoid valves for operating the cylinders 107 and 108 of the spring guides and the indexing cylinder 110. The solenoid valves are well known in the art; as a consequence, the valves are indicated diagrammatically, together with their windings in the circuit.

The circuit includes a main switch 137 for energizing the main lines 138 and 140 which energize the solenoid valves in response to the several limit switches and manual push button switches. As explained earlier, at the start of a cycle, the components of the machine reside in the loading position shown in FIGURES 4 and 10 for manual insertion of the individual coil springs.

After the coil springs are inserted, the operator depresses the start button which includes a pole 139 for closing the circuit across contacts 141, energizing the coil of relay CR–1 which is interposed in line 142. Upon being energized, relay CR–1 closes its contact 143 in branch line 144, thus providing a holding circuit to the relay coil from line 138, line 144 to line 142, through the relay coil to the opposite power line 140. The holding contact 143 also energizes a signal light 145 in line 146. Relay CR–1 remains energized through its holding circuit until the stop switch in line 138 is depressed. The holding contact 143 also energizes a branch line 147 which leads to a manual lock switch 158 having contacts 148 interposed in line 147 to complete a circuit through the winding 150 of the locking valve indicated at 151.

The main starting switch includes a second pole 152 engageable with contacts 153 in line 154. Line 154 is energized by way of line 147 and completes a circuit through the winding 155 of the loading valve indicated at 156. Valve 156 is interconnected with a suitable source of air pressure, as indicated at 157, and is ported to supply air pressure to the lines 114 and 117 upon being energized. Accordingly, when the starting button is depressed, air pressure is supplied by conduits 114 and 117 to the cylinders 107 and 108 to insure that the components are in the normal loading position shown in FIGURE 10 at the start of the cycle.

It will be understood that the solenoid valves, which are conventional, are provided with suitable ports to permit the reverse flow of exhaust air upon actuation of the cylinders. Thus, when valve 156 is energized, the air from the cylinders exhausts by way of the conduits 115 and 118 to the solenoid valves of these conduits which are deenergized at this point.

After the coil springs are inserted, the locking switch 158 is depressed to shift the components to the locking position shown in FIGURE 11. Upon being depressed, the pole 160 of the locking switch closes the contacts 148 thus completing a circuit from power line 138, line 147, line 161 and through winding 150 of the locking valve to the power line 140. Locking valve 151 includes a pressure supply conduit 157 and conduits 114 and 118, as indicated. Upon being energized, air pressure is supplied to these lines, causing the cylinders 107 and 108 to shift to the locking position shown in FIGURE 11.

Figure 12:
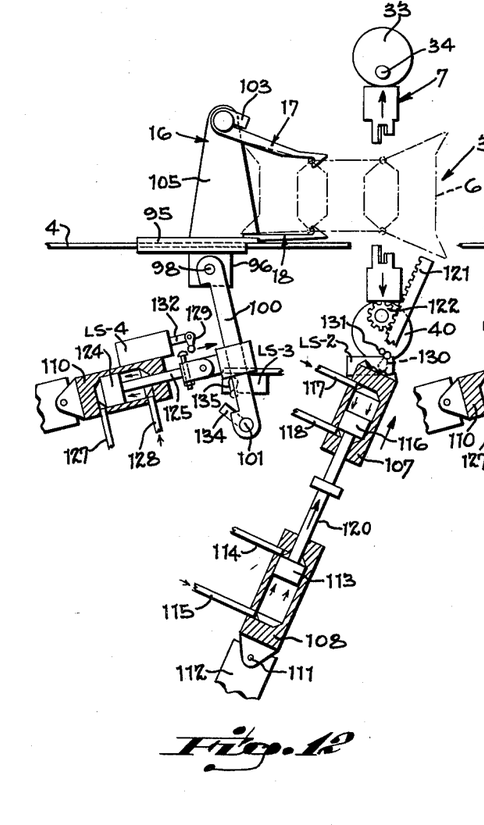
FIGURE 12 is a similar diagrammatic view showing the guides in retracted position corresponding to FIGURE 7.

After the helicals are woven in place, the operator depresses the retract button 162 to retract the upper and lower spring guides (FIGURE 12). At this point, the machine operates automatically to retract, index the springs and return the parts to the loading position, as explained below. Upon being depressed, the pole of the retracting switch 162 closes the contacts 163 in line 164. Line 164 thus completes a circuit from line 147, through selector switch 136 to line 159, and through the winding 165 of the retracting valve. A second manual switch 166, which is used only under manual control, as explained later, completes the circuit by way of line 167 to the second winding 168 of the retracting valve. When these windings are energized, air pressure is supplied by way of the supply line 157 through the valve to the conduits 115 and 117 (FIGURE 12) causing the upper and lower cylinders 107 and 108 to be actuated to retract the guides.

When the eccentric 40 rotates to the position shown, its pin 131 shifts the arm 130 of limit switch LS–2 which is interposed in the line 170. Upon being tripped, the limit switch energizes winding 171 of the indexing valve 172; therefore, air pressure is supplied to conduit 127 of cylinder 110, causing the indexing mechanism to shift forwardly as shown in FIGURE 13. At the forward limit of motion, the finger 134 trips the arm 135 of limit switch LS–3 (FIGURE 13). Limit switch LS–3 is interposed in line 173, and upon closing, energizes the relay CR–2. Upon being energized, relay CR–2 opens its normally closed contact 174 of line 170 and closes its normally open contact 175 in line 176. Accordingly, the winding 171 of the indexing valve is deenergized and its second winding 177 in line 176 is energized. At this point, air pressure is supplied by way of conduit 128 and exhausted from cylinder 110 by way of line 127, causing the indexing mechanism to shift the assembled spring rearwardly as in FIGURE 12.

During rearward motion of the indexing piston, the pin 133 intercepts the pawl 129 of limit switch LS–4. Switch LS–4 is interposed in branch line 178, and upon being tripped, completes a circuit to the winding 155 of the loading valve 156. Upon being energized, valve 156 supplies pressure to the cylinders 107 and 108 by way of of lines 114 and 117, thus shifting the upper and lower guides 7 and 8 from the retracted position of FIGURE 13 back to the loading position of FIGURE 10 for the next cycle of operation.

If desired, the control circuit may include limit switches mounted relative to the upper and lower spring guides to initiate the cycle automatically after the helicals are laced upon the spring. These switches, indicated at LS–5 and LS–6 are interposed in the line 179 by-passing the manual retracting switch 162. These limit switches are normally open and are mounted relative to the upper and lower guides to be closed by the upper and lower helicals after they are laced in place. When both switches are closed, the circuit is completed to the windings 165 and 168 of the retracting valve. Accordingly, the machine operates automatically through its cycle to retract the guides, index the spring assembly and finally to shift the guides back to the loading position in response to the lacing of the helicals.

When it is desired to operate the machine through manual control, the selector switch 136 is shifted to its second position, such that its pole 180 opens the circuit to line 159, while its second hole 181 closes a circuit from line 144 to line 182. For manual operation, the main start button is first depressed to energize relay CR–1 and its holding contact 143 so as to energize line 147 and also to energize line 154 through the second pole 152 of the starting switch. This insures that the components are in loading position by energization of winding 155 of loading valve 156. To shift the components to locking position, the locking switch 158 is operated as before, so as to energize winding 150 by way of line 161.

For retracting the components, the manual retracting switch 166 is depressed thus completing a circuit from line 182 by way of branch lines 183 and 184 to the windings 165 and 168 of the retracting valve. Since the line 159 for automatic operation is now deenergized, limit switch LS–2 of line 170 does not initiate the indexing cycle when the guides are retracted, as was the case during the automatic cycle. In order to shift the indexing mechanism forwardly to engage the helical, it is necessary to close the manual forward index push button switch 185, which completes a circuit from line 182 and branch line 186 to winding 171.

At the forward limit of indexing motion, the mechanism will stop since line 159 and limit switch LS–3 are now deenergized and cannot energize relay CR–2 of line 173. Therefore, in order to complete the indexing stroke, it is necessary to depress the reverse index push button 187 in branch line 188, which energizes the winding 177. This winding causes air to be advanced to conduit 128, thus shifting the indexer rearwardly to complete the indexing operation (FIGURE 12).

Having described our invention, we claim:

1. In a spring assembly machine, an apparatus for receiving rows of coil springs having upper and lower terminal coils, said apparatus positioning the springs in adjacent rows with portions of the terminal coils in mating relationship for threading an upper and lower helical wire thereon, said apparatus comprising, a machine frame having upper and lower spring guides mounted for reciprocation relative to one another, said spring guides normally residing in a loading position and having open throats facing one another adapted to receive the mating portions of adjacent upper and lower terminal coils, power means connected to said upper and lower spring guides for shifting the same toward one another to a locking position, said upper and lower guides thereby compressing the adjoining rows of coil springs, each of said spring guides having an opening in one side thereof extending along an axis transverse to said open throat and communicating therewith, respective locking elements pivotally mounted upon said upper and lower guides, said locking elements having end portions adapted to pass through the respective openings of the spring guides, said locking elements adapted to be shifted in unison with said upper and lower spring guides, said locking elements residing in a retracted position when the spring guides are in loading position, and stationary means engageable with said locking elements adapted to shift the same into pressure engagement with the mating portions of the terminal coils within said throats in response to the shifting motion of said upper and lower spring guides to said locking position, said throats adapted to receive an upper and lower rotating helical wire and to guide the same longitudinally upon said mating portions of the terminal coils while the same are locked in position therein by the locking elements.

2. In a spring assembly machine, an apparatus for receiving rows of coil springs having upper and lower terminal coils, said apparatus positioning the springs in adjacent rows with portions of the terminal coils in mating relationship for threading a helical wire thereon, said apparatus comprising a machine frame having upper and lower spring guides mounted for reciprocation relative to one another and normally residing in a loading position, said upper and lower guides having open throats facing one another and adapted to receive the mating portions of the adajcent upper and lower terminal coils when in said loading position, power means connected to said upper and lower spring guides for shifting the same toward one another to a locking position after the individual springs are inserted therein, each of said upper and lower spring guides having an opening in one side thereof extending along an axis transverse to said open throat and communicating therewith, respective locking elements having pivot means mounted upon said upper and lower guides for movement therewith from said loading position to the locking position, said locking elements normally residing in a retracted position relative to said throats, and stationary actuating means mounted relative to said upper and lower spring guides, said locking elements having respective coil-engaging portions extending from one side of said pivot means adapted to pass through the respective openings of the spring guides, said locking elements each having an actuating portion, said actuating portions being engageable with said stationary actuating means for shifting the locking elements to a locking position overlying the mating portions of the terminal coils within the open throats in response to the shifting motion of when said upper and lower guides toward one another to said locking position, said open throats adapted to receive upper and lower rotating helical wires and to guide the same upon said mating portions of the terminal coils while the same are locked in position therein by the locking elements.

3. In a spring assembly machine, an apparatus for receiving coil springs having upper and lower terminal coils, said apparatus positioning the springs in rows with portions of the terminal coils in mating relationship to receive upper and lower helical wires, said apparatus comprising, upper and lower spring guides mounted relative to said machine for reciprocation relative to one another and normally residing in a loading position, said spring guides adapted to be shifted toward one another from said loading position to a locking position, a spring-receiving section comprising respective skid plates mounted on said upper and lower guides, said skid plates being adapted to reciprocate with the upper and lower spring guides toward one another from the loading position to the locking position, said skid plates adapted to receive the individual coil springs therebetween and having opposed converging surfaces leading to said upper and lower guides adapted to compress the terminal coils as the coil springs are inserted therein, said upper and lower guides having open throats residing adjacent the inner ends of said skid plates and facing one another, said upper and lower guides each having a vertical element projecting outwardly beyond the surface of the skid plates, said elements being spaced rearwardly from the inner edges of the skid plates and delineating the rearward sides of said open throats, said open throats thereby adapted to receive the terminal coil portions of a previously assembled row of coil springs and to receive terminal coil portions of individual coil springs advanced between the skid plates with the skid plates and upper and lower guides in said loading position, thereby to confine the said portions of adjoining rows in mating relationship, and power means connected to said upper and lower guides for shifting the same from said loading position toward one another to a locking position, thereby compressing the coil springs, with the mating portions of the terminal coils residing within said throats, said upper and lower guides adapted to receive upper and lower helical rotating wires and to guide the same about said mating portions within said throats.

4. In a spring assembly machine, an apparatus for receiving rows of coil springs having upper and lower terminal coils, said apparatus adapted to position said springs in adjacent rows with portions of the terminal coils in mating relationship for threading helical wires thereon, said apparatus comprising, a machine frame having upper and lower spring guides disposed in longitudinally spaced relationship, said upper and lower guides being in opposed relationship and mounted for reciprocation relative to one another and normally residing in a loading position, said guides having generally vertical open throats facing one another adapted to receive the mating portions of the upper and lower terminal coils, respective upper and lower stationary stripper elements interposed longitudinally between said upper and lower spring guides, said stripper element being generally U-shaped and providing generally horizontal open throats facing rearwardly, said upper and lower guides adapted to be shifted from said loading position toward one another to a locking position wherein the open throats of the upper and lower guides reside longitudinally in alignment with the open throats of said stripper elements and thereby delineate upper and lower longitudinal passageways with said mating portions of the terminal coils residing therein, said longitudinal passageways adapted to guide a rotating upper and lower helical wire longitudinally upon said mating portions, said upper and lower guides adapted to be shifted outwardly from said locking position to a retracted position, said U-shaped stationary stripper elements confining said helical wires upon retraction of said guides and thereby stripping the same from the guides, whereby the helical wire is adapted to be indexed rearwardly in a horizontal plane from the rearwardly facing throats of the stationary stripper elements.

5. In a spring assembly machine, an apparatus for receiving rows of coil springs having upper and lower terminal coils, said apparatus adapted to position said springs in adjacent rows with portions of the terminal coils in mating relationship for threading helical wires thereon, said apparatus comprising, a machine frame having upper and lower spring guides disposed in longitudinally spaced relationship, said upper and lower guides being in opposed relationship and mounted for reciprocation relative to one another, said guides normally residing in a loading position and having generally vertical open throats facing one another adapted to receive the mating portions of the upper and lower terminal coils, respective upper and lower stationary stripper elements interposed longitudinally between said upper and lower spring guides, said stationary stripper elements being generally U-shaped and providing generally horizontal open throats facing rearwardly, power means connected to said upper and lower guides for shifting the same from said loading position toward one another to a locking position wherein the open throats thereof reside longitudinally in alignment with the open throats of said stripper elements and thereby delineate upper and lower longitudinal passageways with said mating portions of the terminal coils residing therein, said longitudinal passageways adapted to guide a rotating upper and lower helical wire longitudinally upon said mating portions, said power means adapted to shift said upper and lower guides outwardly to a retracted position, said U-shaped stationary stripper elements confining said helical wires upon retraction of said guides, an indexing mechanism adapted to engage said upper and lower helical wires at points between said stripper elements, and means for reciprocating said indexing mechanism for engaging said helicals and shifting the same rearwardly from the rearwardly facing throats of said stripper elements.

6. In a spring assembly machine, an apparatus adapted to position individual coil springs in a row with upper and lower portions of the springs in mating relationship with a previously assembled row for threading upper and lower helical wires thereon, said apparatus comprising, a machine frame having upper and lower spring guides normally residing in a loading position and having open throats facing one another and adapted to receive the said mating portions, opposed skid plates projecting outwardly from said upper and lower guides, said skid plates being shiftable in unison with the upper and lower guides and delineating a converging passageway leading to said open throats and engaging the individual row of coil springs endwisely when the said spring guides reside in said loading position, actuating means connected to said upper and lower guides for shifting the same toward one another to a locking position for application of said upper and lower helical wires to said mating portions, said actuating means adapted to shift said upper and lower guides and skid plates outwardly to a retracted position after application of said helical wires, whereby the upper and lower spring guides are retracted to a disengaged position with the mating portions of said springs, an indexing mechanism including hook elements engageable with said upper and lower helical wires, a second actuating means connected to said index mechanism for shifting the same forwardly to engage said hook elements with said helical wires and for shifting the index mechanism rearwardly to an indexing position with said helical wires engaged therein, said index mechanism thereby drawing said individual row of coil springs inwardly relative to said converging passageway and advancing the trailing upper and lower portions thereof toward the open throats of the upper and lower guides, said guides having elements projecting toward one another and disposed along the rearward side of said open throats, said elements engageable with said trailing portions for subsequent confinement within said open throats.

7. In a spring assembly machine, an apparatus adapted to position coil springs in adjacent rows with upper and lower portions of the springs in mating relationship for threading helical wires thereon, said apparatus comprising, a machine frame having upper and lower spring guides mounted in longitudinal spaced relationship for reciprocation relative to one another, said spring guides normally residing in a loading position and having generally vertical open throats facing one another and adapted to receive the mating upper and lower portions of the coil springs, power means connected to said upper and lower spring guides for shifting the same toward one another to a locking position, respective stationary strippers interposed longitudinally between said upper and lower spring guides, said stationary strippers being generally U-shaped and providing generally horizontal open throats facing rearwardly, the open throats of said strippers and guides delineating a longitudinal passageway when said guides are in said locking position, respective locking fingers pivotally mounted upon said upper and lower spring guides, said locking fingers normally residing in a retracted position relative to the throats of said guides and shifting into said throats in overlying relationship with the mating portions of the terminal coils when said upper and lower guides are shifted to said locking position, whereby an upper and lower helical wire may be threaded longitudinally through said longitudinal passageway and upon said mating portions, said power means adapted to shift said upper and lower guides outwardly to a retracted position relative to said stationary strippers, leaving said helical wires confined in the throats of said strippers, an indexing mechanism engageable with the upper and lower helical wires at points between said strippers after the upper and lower guides are retracted, and a second power means for advancing and retracting said indexing means and thereby shifting said assembled rows of coil springs rearwardly from the open throats of the stripper elements.

8. In a spring assembly machine, an apparatus for receiving rows of coil springs having upper and lower terminal coils, said apparatus adapted to position said springs in adjacent rows with upper and lower portions thereof in mating relationship for threading helical wires thereon, said apparatus comprising, a machine frame having upper and lower spring guides normally residing in a loading position and having generally vertical open throats facing one another and adapted to receive the said mating portions, a first power means having a three-position shiftable thrust element connected to said upper and lower guides, said shiftable thrust element adapted to shift said upper and lower spring guides toward one another from said loading position to a locking position for application of said upper and lower helical wires to said mating portions, control means responsive to the application of the helical for energizing said first power means to shift said thrust element and upper and lower guides outwardly from said locking position to a retracted position, an indexing mechanism engageable with said upper and lower helical wires, a second power means connected to said index mechanism, a second control means associated with said guides and interconnected with the second power means for shifting the index mechanism forwardly to engage said helical wires and for shifting the index mechanism rearwardly to an indexing position with said helical wires engaged therein, and a third control means associated with the first power means and adapted to energize the first power means to actuate the thrust element in a direction to shift the upper and lower guides from said retracted position to the loading position after the index mechanism is shifted to the retracted position.

9. In a spring assembly machine, an apparatus adapted to position coil springs in adjacent rows with upper and lower portions in mating relationship for threading helical wires thereon, said apparatus comprising, opposed spring guides mounted for movement relative to one another, said guides normally residing in a loading position and being shiftable from the loading position toward one another to a locking position and from said locking position away from one another to a retracted position, a pair of power motors mounted in tandem relationship, the first of said motors being anchored relative to the assembly machine, a shiftable thrust element projecting outwardly from said first motor, the second of said motors being connected to said shiftable thrust element and adapted to reciprocate relative to the shiftable thrust element, driving means interconnecting said second motor to the opposed guides, and means for energizing the first and second motors in combination, thereby to shift said opposed guides to said loading, locking or retracted positions.

10. In a spring assembly machine, an apparatus adapted to position coil springs in adjacent rows with upper and lower portions in mating relationship for threading helical wires thereon, said apparatus comprising, opposed spring guides mounted for movement relative to one another, said guides normally residing in a loading position and being shiftable from the loading position toward one another to a locking position and from said locking position away from one another to a retracted position, a pair of fluid pressure cylinders mounted in tandem relationship, the first of said cylinders being anchored relative to the assembly machine, a piston rod projecting outwardly from said first cylinder, the second of said cylinders being slidably mounted upon said piston rod and adapted to be reciprocated bodily relative to the said piston rod, driving means interconnecting said second cylinder to the opposed spring guides, and means for supplying and exhausting fluid pressure relative to the first and second cylinders in combination, thereby to advance or retract the piston rod and second cylinder and shifting said opposed guides to said loading, locking or retracted positions.

11. In a spring assembly machine, an apparatus adapted to position coil springs in adjacent rows with upper and lower portions in mating relationship for threading helical wires thereon, said apparatus comprising opposed spring guides shiftably mounted relative to said machine, said guides normally residing in a loading position and being shiftable in sequence from the loading position toward one another to a locking position and away from one another to a retracted position, a pair of cylinders mounted in tandem relationship, the first of said cylinders being anchored relative to the assembly machine and having a piston including a piston rod projecting outwardly therefrom, the second of said cylinders shiftably mounted on said piston rod and having a piston therein attached to the rod, driving means interconnecting said second cylinder with said opposed guides, respective pairs of fluid pressure conduits communicating with opposite ends of said cylinders, and means for supplying fluid pressure selectively to said conduits in combination, thereby to advance or retract the piston rod and advance or retract the second cylinder relative to the piston rod to shift said opposed guides to said loading, locking or retracted positions.

12. In a spring assembly machine having upper and lower spring guides adapted to be shifted relatively to a loading, locking or retracted position, power means for shifting the upper and lower guides comprising, a first and second fluid pressure cylinder mounted in tandem, means anchoring said first cylinder to the machine, a first piston mounted in said first cylinder for reciprocation, a piston rod projecting from said first cylinder, the second cylinder being slidably mounted on the projecting portion of said piston rod, a second piston disposed within the second cylinder and attached to the outer end of the piston rod, said second cylinder being shiftable bodily relative to the piston rod, upper and lower eccentrics in driving connection with the upper and lower guides for shifting said guides to said loading, locking and retracting position upon rocking motion of the eccentrics, driving means interconnecting said second cylinder to said eccentrics for rocking the same to positions which shift the upper and lower guides to said loading, locking and retracted positions, respective pairs of fluid pressure conduits communicating with opposite ends of said cylinders, and means for supplying fluid pressure selectively to said conduits for shifting said piston rod and second cylinder in forward or reverse directions in combination with one another, thereby to shift the opposed guides to said loading, locking and retracted positions.

13. In a spring assembly machine, having upper and lower spring guides adapted to be shifted to a loading, locking or retracted position, power means for shifting the upper and lower guides comprising, a first and second fluid pressure cylinder mounted in tandem, means connecting said first cylinder to the machine, a piston rod projecting from said first cylinder, the second cylinder being slidably mounted on the projecting portion of said piston rod, said second cylinder being shiftable relative to the piston rod, upper and lower eccentric shafts including eccentrics in driving connection with the upper and lower guides for shifting the same, means interconnecting said shafts for rotating said upper and lower shafts and eccentrics in unison to corresponding loading, locking and retracted positions, a pinion mounted on one of said shafts, a rack meshing with said pinion and connected to the second cylinder, and means for supplying and exhausting fluid pressure relative to said first and second cylinders in combination to retract or advance the piston rod and second cylinder relative to one another, thereby to shift said upper and lower guides to said loading, locking or retracted positions.

14. In a spring assembly machine having opposed spring guides adapted to be shifted to a loading, locking or retracted position, power means for shifting the opposed guides comprising, a first and second fluid pressure cylinder mounted in tandem, means connecting said first cylinder to the machine, a piston rod projecting from said first cylinder, said second cylinder being slidably mounted on the projecting portion of said piston rod, said second cylinder being shiftable relative to the piston rod, driving means interconnecting said second cylinder to said opposed guides for shifting the same to said loading, locking and retracted positions, respective fluid pressure conduits communicating with opposite ends of said cylinders, a plurality of electrically operated valves adapted to supply and exhaust fluid pressure relative to said conduits in predetermined combinations, and respective electrical switches for energizing said electrically operated valves, thereby to advance or retract said piston rod and second cylinder in predetermined sequence to shift the opposed guides to said loading, locking or retracted positions.

References Cited in the file of this patent

UNITED STATES PATENTS

| | | |
|---|---|---|
| 1,353,656 | Heisler | Sept. 21, 1920 |
| 1,835,819 | Stackhouse | Dec. 8, 1931 |
| 1,922,002 | Karr | Aug. 8, 1933 |
| 2,286,326 | Zimmerman et al. | June 16, 1942 |
| 2,388,106 | Woller | Oct. 30, 1945 |
| 2,470,812 | Gauci et al. | May 24, 1949 |
| 2,625,963 | Bronstien et al. | Jan. 20, 1953 |
| 2,663,038 | Gail | Dec. 22, 1953 |